US010142186B2

(12) United States Patent
Nadaf et al.

(10) Patent No.: US 10,142,186 B2
(45) Date of Patent: Nov. 27, 2018

(54) SYSTEM AND METHOD FOR DESIGNING A NETWORK FOR ONE OR MORE ENTITIES IN AN ENTERPRISE

(71) Applicant: Tata Consultancy Services Limited, Maharashtra (IN)

(72) Inventors: Shameemraj M. Nadaf, Bangalore (IN); Vishvesh Revoori, Bangalore (IN); Hemant Kumar Rath, Bangalore (IN); Anantha Simha, Bangalore (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 258 days.

(21) Appl. No.: 14/578,371

(22) Filed: Dec. 20, 2014

(65) Prior Publication Data
US 2015/0188774 A1 Jul. 2, 2015

(30) Foreign Application Priority Data
Dec. 26, 2013 (IN) .......................... 4061/MUM/2013

(51) Int. Cl.
*G06F 15/173* (2006.01)
*H04L 12/24* (2006.01)

(52) U.S. Cl.
CPC .................. *H04L 41/145* (2013.01)

(58) Field of Classification Search
CPC ..................................... H04L 41/145
USPC ......................................... 709/223
See application file for complete search history.

(56) References Cited

U.S. PATENT DOCUMENTS

| 5,598,532 | A | * | 1/1997 | Liron | ................ | H04L 41/0826 370/254 |
| 7,096,176 | B1 | * | 8/2006 | Hess | ................ | H04B 10/07 703/13 |
| 2001/0034591 | A1 | * | 10/2001 | Kawas | ................ | G06F 17/50 703/13 |
| 2003/0099014 | A1 | * | 5/2003 | Egner | ................ | H04J 14/0227 398/79 |

(Continued)

FOREIGN PATENT DOCUMENTS

| CN | 102880743 A | 1/2013 |
| WO | WO2001084272 A3 | 11/2001 |

OTHER PUBLICATIONS

David Alderson, "Toward an Optimization-Driven Framework for Designing and Generating Realistic Internet Topologies" Management Science and Engineering Stanford University.

*Primary Examiner* — Vivek Srivastava
*Assistant Examiner* — Atta Khan
(74) *Attorney, Agent, or Firm* — Thompson Hine LLP

(57) ABSTRACT

System(s) and method(s) for designing a network of one or more entities in an enterprise is disclosed. A design type along with configurable design parameters is selected from a list of designs. Requirements associated with design of entities are collected from the users. The requirements and configurable design parameters are analyzed to obtain analysis results. Based on at least one of a layer-wise requirement and distribution or a zone-wise requirement and distribution, network devices and modules associated with the entities are determined. One or more designs are generated for the network of entities based on the layer-wise requirement and distribution or the zone-wise requirement and distribution of network devices and modules associated with the entities in the enterprise.

13 Claims, 6 Drawing Sheets

(56) References Cited

U.S. PATENT DOCUMENTS

| | | | | |
|---|---|---|---|---|
| 2003/0145110 A1* | 7/2003 | Ohnishi | ............... | G06N 3/126 |
| | | | | 709/242 |
| 2004/0221038 A1* | 11/2004 | Clarke, Jr. | ............ | G06F 9/5072 |
| | | | | 709/226 |
| 2010/0110932 A1* | 5/2010 | Doran | ..................... | H04L 41/12 |
| | | | | 370/254 |
| 2012/0072985 A1* | 3/2012 | Davne | ................. | H04L 63/0272 |
| | | | | 726/22 |
| 2012/0271929 A1 | 10/2012 | Manthoulis et al. | | |
| 2015/0115711 A1* | 4/2015 | Kouroussis | ............. | H02J 9/061 |
| | | | | 307/23 |
| 2015/0121113 A1* | 4/2015 | Ramamurthy | .......... | H02J 9/061 |
| | | | | 713/340 |

* cited by examiner

SYSTEM AND METHOD FOR DESIGNING A NETWORK FOR ONE OR MORE ENTITIES IN AN ENTERPRISE

CROSS-REFERENCE TO RELATED APPLICATIONS AND PRIORITY

The present application does claim priority from India patent application number 4061/MUM/2013 filed on 26 Dec. 2013.

TECHNICAL FIELD

The present disclosure in general relates to a method and system for providing a network design. More particularly, the present disclosure relates to designing a network for one or more entities forming an enterprise network.

BACKGROUND

In the present world of globalization, competition in terms of technological advancements has drastically increased between various organizations. Also, organizations have their entities (data centers, branch offices, headquarters, remote offices, etc.,) situated at various locations of the world. To meet the competitive requirements, it's very important that organization should not lack in terms of connectivity inside and between any of its differently located entities or with any of service obtaining party/stakeholder. In order to obtain maximum contribution from the engaged manpower in the organization, quick and faster access to data at any time is required regardless of the point whether the data is centralized or is hosted at any of the departmental servers.

To accommodate this increasing demand of anytime data access and also to minimize all chances of delay and error (in terms of security, bandwidth, scalability, and reliability), the product vendors keep introducing new protocols and technologies at a rapid rate. This new introduction creates a challenge for a network engineer to design a network keeping pace with the accelerating changes in the internetworking industry.

In general, the network engineer requires a systematic methodology to design a network. Also, in most cases, it is very difficult to modify an existing design in order to bring in some new changes in an existing network. This requires a lot of manual effort and is time consuming.

SUMMARY OF THE INVENTION

This summary is provided to introduce aspects related to system(s) and method(s) for designing a network for one or more entities forming an enterprise network and the aspects are further described below in the detailed description. This summary is not intended to identify essential features of the claimed subject matter nor is it intended for use in determining or limiting the scope of the claimed subject matter.

The present disclosure relates to a system for designing network of one or more entities in an enterprise. The system comprises of a processor and a memory coupled to the processor. The processor is capable of executing a plurality of modules stored in the memory. The plurality of module comprises of a selection module configured to select a design type from a list of design types based upon the requirements. The design type is associated with configurable design parameters. The plurality of modules further comprises a collecting module and an assessment module. The collecting module configured to receive requirements associated with designing of the one or more entities from users. The assessment module is configured to analyze the requirements and the configurable design parameters to provide analysis results, determine at least one of a layer-wise requirement and distribution or a zone-wise requirement and distribution of one or more network device and modules associated with the one or more entities based on the analysis results, and with respect to the design type selected by the user. The plurality of modules further comprises a generation module configured to generate one or more design of the network of the one or more entities along with analysis results based on the at least one of the layer-wise requirement and distribution or the zone-wise requirement and distribution of the one or more network device and modules.

The present disclosure also relates to a method for designing network of one or more entities in an enterprise. The method comprises of selecting a design type from a list of design types, wherein the design type is associated with configurable design parameters, collecting requirements associated with designing of the one or more entities from users and analyzing the requirements and configurable design parameters to provide analysis results. The method further comprises of determining at least one of a layer-wise requirement and distribution or a zone-wise requirement and distribution of one or more network device and modules associated with the one or more entities based on the analysis results, and with respect to the design type selected by the user and generating one or more design along with the analysis results for the network of the one or more entities based on the at least one of the layer-wise requirement and distribution or the zone-wise requirement and distribution of the one or more network device and modules. In one embodiment, wherein the aforementioned steps of selecting, collecting, analyzing, determining and generating are performed by a processor using computer-readable instructions stored in a memory.

The present disclosure also relates to a computer program product having embodied thereon a computer program for designing network of one or more entities in an enterprise. The computer program product comprises of a program code selecting a design type from a list of design types, wherein the design type is associated with configurable design parameters, a program code collecting requirements associated with designing of the one or more entities from users and a program code analyzing the requirements and configurable design parameters to provide analysis results. The computer program product further comprises of a program code determining at least one of a layer-wise requirement and distribution or a zone-wise requirement and distribution of one or more network device and modules associated with the one or more entities based on the analysis results, and with respect to the design type selected by the user and a program code generating one or more design along with the analysis results for the network of the one or more entities based on the at least one of the layer-wise requirement and distribution or the zone-wise requirement and distribution of the one or more network device and modules.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer to like features and components.

DETAILED DESCRIPTION

While aspects of described system and method to design a network for one or more entities forming an enterprise network may be implemented in any number of different computing systems, environments, and/or configurations, the embodiments are described in the context of the following exemplary system.

Figure 1:
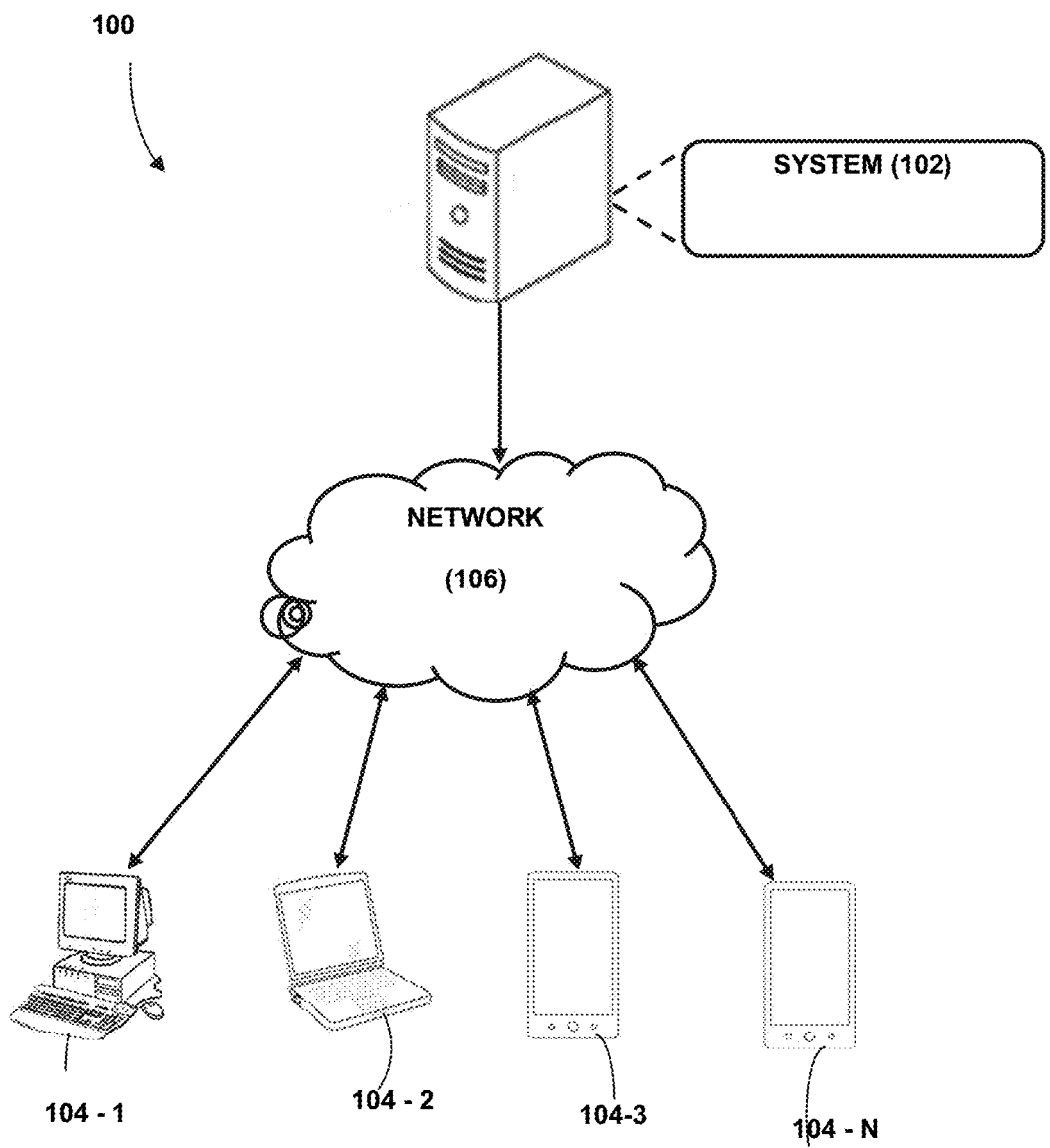
FIG. 1 illustrates a network implementation of a system to design a network for one or more entities forming an enterprise network, in accordance with an embodiment of the present subject matter.

Referring now to FIG. 1, a network implementation 100 of system 102 to design a network for one or more entities forming an enterprise network is shown. Requirements associated with designing a network for one or more entities are received by a user and are further used for generating the network design of the one or more entities. The design is generated by selecting a particular design type. Each design type is associated with configurable design parameters. These parameters are used along with the requirements to generate the network design of the one or more entities. One or more computational techniques are used to process and analyze the design parameters and the requirements to generate the analysis results. The analysis results are finally used to obtain the network design of one or more entities forming an enterprise network.

Although the present subject matter is explained considering that the system 102 implemented as an application on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2, 104-3 . . . 104-N, collectively referred to as user device(s)104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
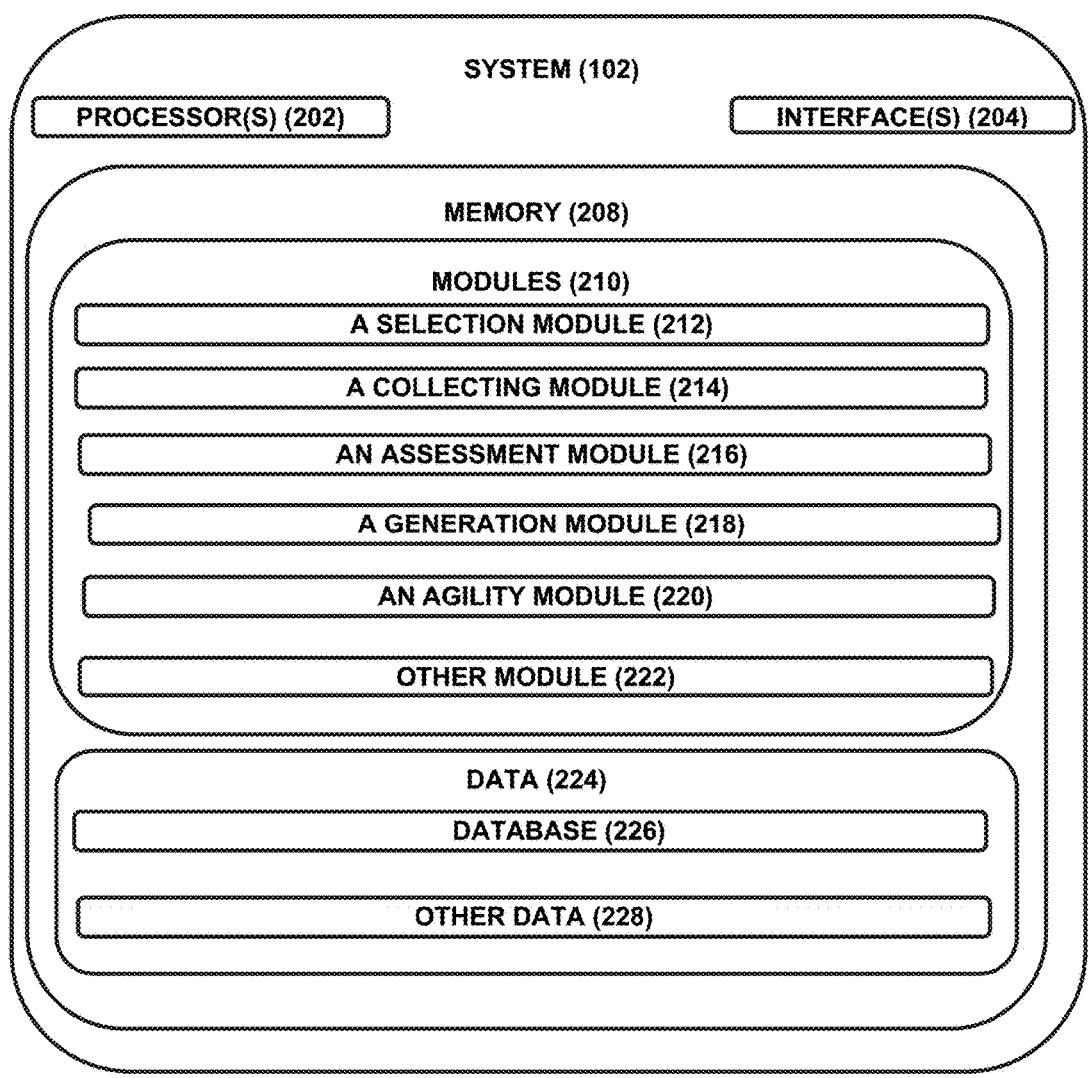
FIG. 2 illustrates the system to design a network for one or more entities forming an enterprise network, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, a memory 208. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 208.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 208 may include modules 210 and data 224.

The modules 210 include routines, programs, objects, components, data structures, etc., which perform particular tasks, functions or implement particular abstract data types. In one implementation, the modules 210 may include a selection module 212, a collecting module 214, an assessment module 216, a generation module 218, and an agility module 220. The other modules 222 may include programs or coded instructions that supplement applications and functions of the system 102.

The data 224, amongst other things, serves as a repository for storing data processed, received, and generated by one or more of the modules 222. The data 224 may also include a database 226, and other data 228. The other data 228 may include data generated as a result of the execution of one or more modules in the other module 222. The other data 228 may include vendor provided pricing information, vendor announced product End-of-Life (EoL) and End-of-Sale (EoS) information, existing network devices and modules information, etc.

The present disclosure relates to a system(s) and method(s) for designing a network for one or more entities forming an enterprise network (or simply, network). The system 102 supports various design types based on the entity. The various design types include a case where a transformation is required from AS-IS-State (existing state) to To-Be-State (new state) or a new design from ground up or an optimization design. In an optimization design, designing is required for changes taking place in a particular layer(s) and zone(s) in an entity. During the transformation, the system 102 provides network design of the one or more entities by using the already present design of the one or more entities to meet the changes taking place in the one or more entities. Broadly the system 102 receives or collects requirements in form of data. The data is cleaned and normalized. The data is further analyzed and used for optimization and assessment to generate the analysis results associated with design type selected by the user.

The selection module 212 provides a selection of a design type from a list of design types based upon the requirements. The user selects the design parameters through the user interface or I/O interface 204. Design type comprises of a transformation design, a network optimization design, new design or a combination thereof. The design type is associated with configurable design parameters that get selected when the user selects the design type. The user may either process with default configurable design parameters or the user may also configure the design parameters.

The design parameters (configurable design parameters) may be categorized into LAN and SAN design parameters and security and services design parameters. Further, switching and routing functionality may be considered as a part of the LAN design. The LAN design parameter further comprises of port configuration of the switch/router (Fixed, Semi-Modular, Modular configurations and open flow capable switches used for Software Defined Networks (SDNs)), vendor defined platform of the switch/router, oversubscription ratio desired, quantity of ports per switch/router, number of peer links to be reserved between a switch/router pair, number of links to be reserved for tunneling service, link failure redundancy, internal-configuration of a Semi-Modular or Modular switch/router based on the platform and for blade server devices the blade system supported.

The SAN design parameters (configurable design parameters) further comprises of vendor defined platform of the storage switch, internal configuration of a Semi-Modular or Modular storage switch based on the platform, number of links to be reserved for connectivity between storage switch and the aggregation layer LAN switch/router along with the media-type and bandwidth of the links.

The firewall, intrusion detection, intrusion prevention, WAN (Wide Area Network) acceleration, load balancing, voice services, VPN (Virtual Private Network) services, etc., are considered as a part of security and service design. The configurable design parameters are comprised of vendor defined platform of the appliances, maximum throughput, maximum concurrent connections, high availability links between a pair of appliances, internal configuration of Semi-Modular and Modular appliances, link failure redundancy, vendor proprietary appliances configuration (e.g., CISCO® Catalyst 6500 Switch with services), and quantity of appliances based on the multi-tier security.

The configurable design parameters further comprise an extensive set of technical specifications for different network devices such as switches, routers, firewalls, load balancers, IPS, IDS, WAN accelerators. etc., to help the user in configuring the design parameters suitable for the design type selected by the user. The design parameters (configurable design parameters) are generic and apply to any network device from different vendors.

TABLE 1

Technical Specification Considered

Vendor defined Platform of the Device
Vendor defined Device No (Device ID)
Type of the Device
(e.g., Switch, Module, Router, Security Appliance)
Typical Usage of the Device
Device Function based on the Form-Factor
(e.g., Top-of-Rack, End-of-Row, etc.)
Parents of the Device (Dependencies of the Device
(e.g., Nexus 2000 needs Nexus 5000 or Nexus 7000 as a parent)
Children of the Device (Any devices which depend on this device)
Children Support Count
(Maximum number of each child device supported by this device)
Throughput of the Device in Million Packets per Second (Mpps)
Maximum number of concurrent connections supported by the Device.
Is this Device an Enhanced version or Base version?
Is there support for copper link ports?
Total number of Ports present in the Device.
Number of Fast Ethernet ports in the Device.
Number of Gigabit Ethernet ports in the Device.
Number of Ten Gigabit Ethernet ports in the Device.
Number of Gigabit/Ten Gigabit Ethernet ports in the Device.
Number of Forty Gigabit Ethernet ports in the Device.
Number of Hundred Gigabit Ethernet ports in the Device.
Number of FCoE (Fiber Channel over Ethernet) ports in the Device.
Number of Native Fiber Channel Ports in the Device.
Number of Dedicated Fast Ethernet Management ports in the Device.
Maximum Power Consumed by the Device in watts.
Software dependencies of the Device.
License dependencies of the Device.
Number of Rack Units consumed by the Device.
Power Supplies supported by the Device.
FAN trays supported by the Device.
LAN Transceivers supported by the Device.
SAN Transceivers supported by the Device.

The collection module 214 collects requirements associated with the design of a network for one or more entities from the users. The requirements comprise of a requirement about the storage devices or server devices or any other devices. Examples of other devices includes, but is not limited to, printers, IP phones, network cameras, video conference equipment, or a combination thereof. The requirements are received in a form of a spreadsheet (i.e., part of the data 224). The requirements are not limited to spreadsheet; other suitable formats may also be used. Other spreadsheet files provide information such as catalog of an extensive set of technical information about the network devices such as Switches, Routers, Firewalls, Load Balancers, IPS (Intrusion Prevention System), Accessories, Transceivers, etc., (i.e., the database 226) and other information such as pricing information, End-of-Life (EoL) and End-of-Sale (EoS) information, existing network devices information (i.e., the other data 228),etc. Table 1 shows the parameters considered for the technical information of the network devices.

The requirements also comprise information about the entities. The entities may include LAN, SAN, WAN or a combination thereof. The information comprises information about Local Area Network (LAN) requirement data, a Storage Area Network (SAN) requirement data, Wide Area Network (WAN) requirement data or a combination thereof.

Each row of the spreadsheet in the LAN requirements data represents the networking requirement of a particular Server type. The networking requirements of the particular server type use one or more of the following fields across the columns: Server Form-Factor, Zone in which the Server resides, Number of Rack Units consumed by the Server, Fast Ethernet ports data (comprising of number of ports, link type of ports and link Form-Factor of the ports), Gigabit Ethernet ports data (comprising of number of ports, link type of ports and link Form-Factor of the ports), Ten Gigabit Ethernet ports data (comprising of number of ports, link type of ports and link Form-Factor of the ports), Forty Gigabit Ethernet ports data (comprising of number of ports, link type of ports and link Form-Factor of the ports), Hundred Gigabit Ethernet ports data (comprising of number of ports, link type of ports and link Form-Factor of the ports), Dedicated Fast/Gigabit Ethernet Management Ports Hundred Gigabit Ethernet ports data (comprising of number of ports, link type of ports and link Form-Factor of the ports) and the number of servers having similar requirements.

In the spreadsheet, each row in the SAN requirements data represents the networking requirement of a particular Storage device type. The requirement about the particular storage type comprises of the following fields across the columns: Type of the Storage device, Zone in which the Storage device resides, Number of Rack Units consumed by the Storage device, Storage ports data (comprising of number of ports, protocol supported by the ports, bandwidth of the ports, link type of ports and link Form-Factor of the ports) and number storage devices having similar requirements.

In the spreadsheet, each row in the WAN requirements data represents the WAN bandwidth requirement of a particular application. The requirement about the particular application use one or more of the following fields across the columns: Type of the application for e.g., Mail, Chat, Video Streaming, etc., Maximum number of concurrent users supported, Protocols used, Maximum number of control messages per user per protocol, Maximum bandwidth consumed per control message per protocol. Table 2 shows the network requirement (or requirement) data.

TABLE 2

| Category of the Requirement | Requirement data |
|---|---|
| Local Area Network (LAN) | Form-Factor of the Server |
| | Zone to which Server belongs to |
| | Number of Rack Units Consumed |
| | Number of fast ethernet ports present |
| | Link type of the fast ethernet ports present |
| | Form-Factor of the fast ethernet ports present |
| | Number of gigabit ethernet ports present |
| | Link type of the gigabit ethernet ports present |
| | Form-Factor of the gigabit ethernet ports present |
| | Number of ten gigabit ethernet ports present |
| | Link type of the ten gigabit ethernet ports present |
| | Form-Factor of the ten gigabit ethernet ports present |
| | Number of forty gigabit ethernet ports present |
| | Link type of the forty gigabit ethernet ports present |
| | Form-Factor of the forty gigabit ethernet ports present |
| | Number of hundred gigabit ethernet ports present |
| | Link type of the hundred gigabit ethernet ports present |
| | Form-Factor of the hundred gigabit ethernet ports present |
| | Number of dedicated fast/gigabit ethernet ports present |
| | Link type of the dedicated fast/gigabit ethernet ports present |
| | Form-Factor of the dedicated fast/gigabit ethernet ports present |
| | Number of servers with similar configuration |
| Storage Area Network (SAN) | Storage device type |
| | Zone to which the storage device belongs to |
| | Number of Rack units consumed |
| | Number of network ports present |
| | Protocol supported by the ports |
| | Bandwidth of the ports |
| | Link type of the ports |
| | Form-Factor of the ports |

TABLE 2-continued

| Category of the Requirement | Requirement data |
|---|---|
| Wide Area Network (WAN) | Type of application |
| | Maximum number of concurrent users supported |
| | Protocols used |
| | Maximum number of control messages per user per protocol |
| | Maximum bandwidth consumed per control message per protocol |

New design type (or New Network Design): In this type of network design, a new Data Center (DC) is being built from ground up. A location is chosen and the required servers, storage devices, network devices, power devices, cooling equipment and other necessary infrastructure are procured. The system 102 will generate a physical network design, i.e., a Bill of Materials (BoM) for the suitable network devices to be procured and a logical design which provides an overview of the DC network with zone wise (Production, Non-Production, De-Militarized, Management, etc.,) distribution of the devices. New design type so generated should meet the data center demands such as compliance to Service Level Agreements (SLAs), high performance requirements, high reliability, high availability, etc. network design, i.e., a network topology diagram.

Transformation design type: In this type of network design, there is a change going about in an existing enterprise IT infrastructure which is known as transformation. The transformation includes consolidation of servers and storage devices inside a DC, or consolidation of servers and storage devices across the set of existing DCs, or consolidation of many DCs to few DCs, or movement of servers and storage devices across the DCs, or a combination of any of the above. Transformation brings many benefits such as reduction in server sprawl, lower power consumption; lower maintenance costs, etc., and thereby improves efficiencies. Also, it helps to tap onto new technologies which could benefit the business. For the transformation design type, the system will generate a network design (both physical and logical) for the transformed enterprise. In Comparison to a New design type the challenge here is an existing (As-Is-State) network with agreed upon level of performance, SLAs, etc., and the new (To-Be-State) network being designed should either meet or exceed the requirements and lower the Capital (CAPEX) and Operational (OPEX) expenditures. The system 102 will also check on the possibilities of re-using the existing network equipment. However, the entire set of existing equipment may not be useful due to the fact that devices may have crossed the End-of-Sale (EoS) or End-of-Life (EoL) dates as per the equipment vendor policies. Hence, the system 102 will identify the devices that have reached EoL/EoS, decommission them and find suitable replacements for them. Also, New Network Design refers to a Network Design (LAN, SAN and WAN) from ground up as per the selected design type and associated design parameters.

The transformation design refers to transformation of entities (LAN, SAN and WAN) from As-Is-State to To-Be-State when IT transformation is underway for the rest of the IT infrastructure. Network Optimization design refers to tuning of the parameters of the entities (LAN, SAN and WAN). The parameters comprise of response time, delay, etc., and are tuned in order to meet the targets. Network usage is optimized along factors such as bandwidth, up-time, etc.

In the transformation design type the number of server devices and storage devices inside an entity may be consolidated from n to m (m<n)or set of server devices and storage devices present across the entities may be consolidated or set of server devices and storage devices may be moved across the entities or many entities may be consolidated to few entities or a combination thereof.

After the design parameters associated with the any design type are selected, the assessment module 216 analyzes the design parameters and requirement (collectively referred to as input data fed to the execution module) to analyze the requirements and configurable design parameters to perform an As-Is-State analysis, a To-Be-State analysis, a WAN Bandwidth assessment, or a combination thereof. The assessment module 216 performs As-Is-State analysis. The As-Is-State analysis comprises EoL and EoS resolution (decommissioned and retained devices) if required by the design type, network port requirement analysis for servers, storage and other devices, and cost analysis. The To-Be-State Analysis further comprises of network devices and modules selection, cost analysis, Bill of Materials generation, Network topology diagram generation, DC Layout information generation and reports generation and the WAN bandwidth analysis further comprises per application type bandwidth determination and total threshold WAN bandwidth determination.

The assessment module 216 is also configured to optimize number of devices required to design network of entities and the configuration of the devices to determine at least one of the layer-wise requirement and distribution or zone-wise selection and distribution of the network devices and the modules forming the network for one or more entities. The layers comprises of an access layer, an Aggregation/Distribution layer and a Core layer forming a multi-tier network. The network may be based on a traditional architecture or Software Defined Network (SDN) architecture or a combination thereof. The network may extend to other network architectures such as High Performance computing (HPC) network, Financial collocation/Trading network, etc. The zone comprises of zones based on the Software Development Life Cycle stages such as development, staging, testing, production or a combination thereof. Also, Layers refer to in general network architecture whereas the zones refer to the requirements inside an entity. For example, a data center may have production, non-production, DMZ and management zones whereas a branch office may not have a production and non-production zone.

For the any design type, the analysis is performed by the assessment module 216 after the requirement data received is cleansed and normalized. The process of cleansing and normalizing by the user involves making suitable assumptions in order to obtain missing data in a specific category. While collecting data in an Enterprise some data may not be available for e.g., number of ports in a server is known but the bandwidth and link types may not be known and there may be many such servers for which the information may not be available. In such cases, suitable assumptions (made by user) are received by the system to obtain the network design of the one or more entities.

In any design type, the assessment module 216 performs the analysis of the requirements and design parameters (collectively called as data). The assessment module 216 does the selection and determination of the one or more network devices and modules required by identifying and resolving the dependencies. The dependencies refer to the dependent modules and devices. Examples are nexus 2000 is a fabric extender and it requires a parent switch such as nexus 5000 or nexus 7000 to present above it for functioning.

The assessment module 216 upon receiving the design type and requirements with configurable design parameters, will first categorize the input data (requirements and configurable design parameters) into LAN, SAN and WAN requirements based on their functional role. For example, server data ports count, bandwidth and link type falls into LAN requirements category, whereas the server storage ports count, bandwidth and link type falls into SAN requirements category. Similarly, the application QoS falls into WAN requirements category.

Apart from the data collected, the system 102 also uses information stored in the database 226 of different network devices available in the market from Cisco Technology, Inc. of San Jose, Calif. The database stores essential information such as type of product (switch, router, security appliance, transceiver etc.), configuration of the product (fixed or modular with slots), modules (IO, Fabric, Supervisor etc.) required, accessories required, etc. This database 226 is also used by the assessment module 216 to generate network design for a DC. The region specific product pricing information released by the vendor, EoL/EoS information released by the vendor and design parameters (such as over subscription ratio, peer links, redundancy, etc.) are also used (i.e., the other data 228).

Figure 4:
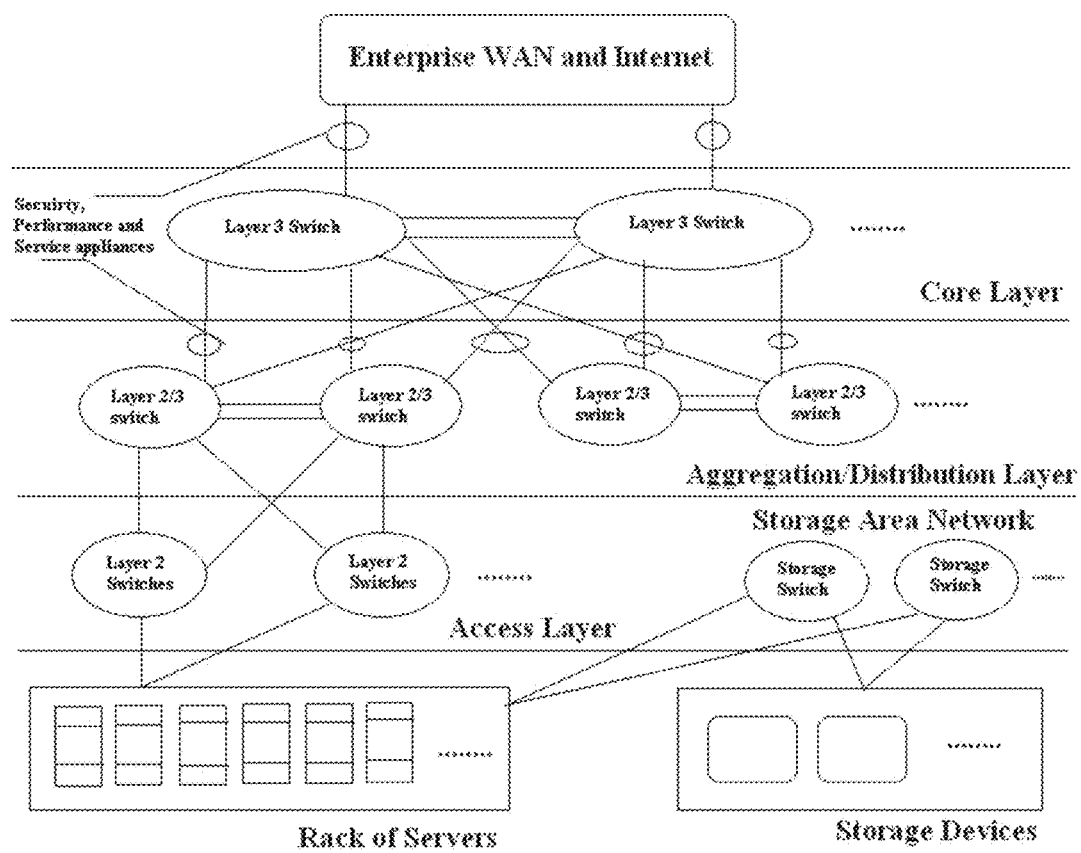
FIG. 4 illustrates details of the process involved in Enterprise Network Design, in accordance with an alternate embodiment of the present subject matter.
Figure 5:
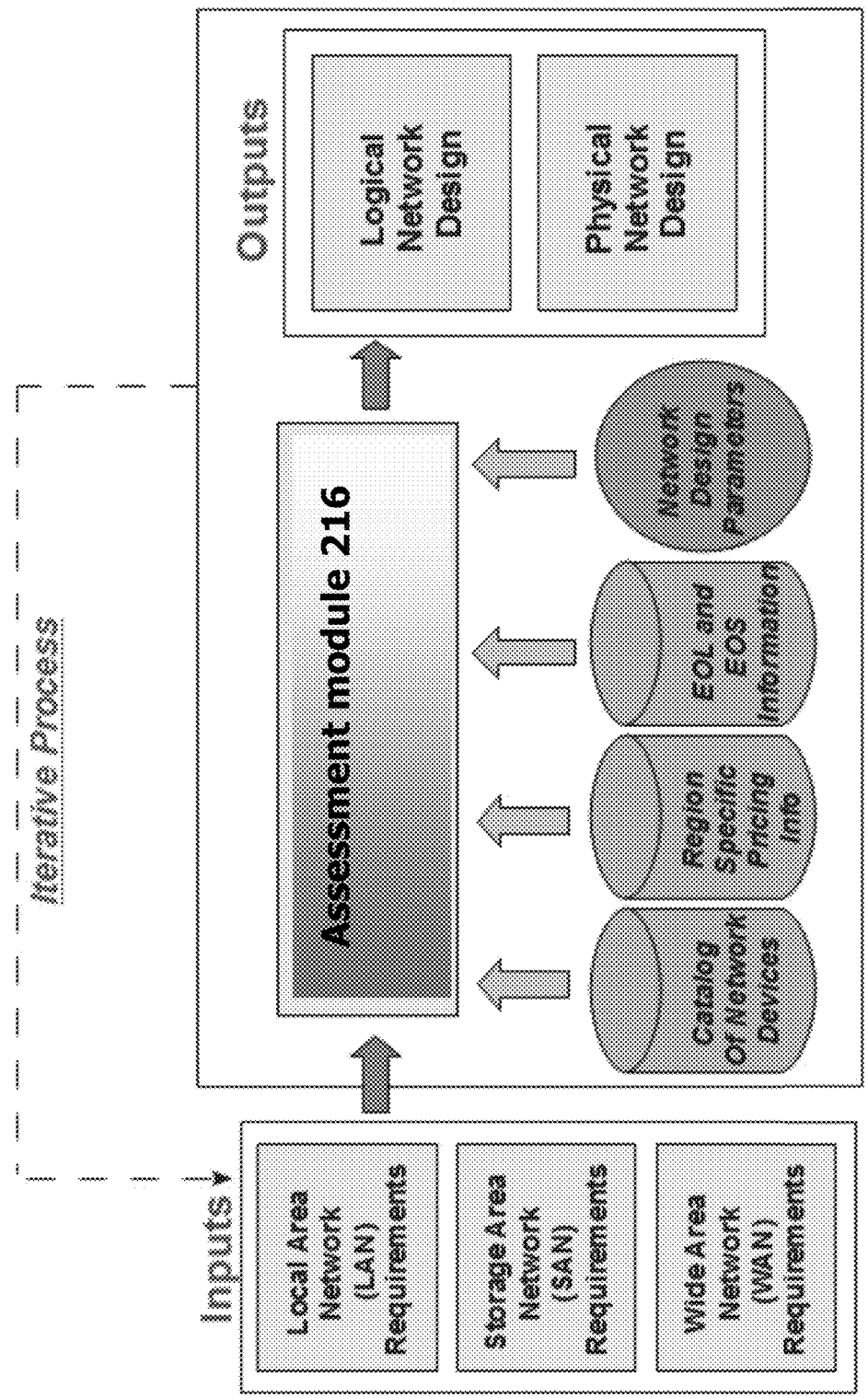
FIG. 5 illustrates the process followed by the system for providing a network design for the selected design type, in accordance with alternate embodiment of the present subject matter.

Referring to FIGS. 4 and 5, the assessment module 216 starts processing the input parameters (requirements and configurable design parameters) with respect to design type selected by the user. Below are described algorithms for New Network Design and the Transformation Network Design. The algorithm has some predefined values for DC network design parameters. The predefined values include oversubscription, redundancy. etc. The other parameters used by the algorithm are device selections (such as a switch belonging to CISCO® Catalyst 6500 Series or CISCO® Nexus 7000 series in the aggregation layer). However, these parameters may also be configured by user (configurable design parameters).

Algorithm 1:

[1] START
[2]  if New network design
[3]  Analyze the LAN, SAN and WAN requirements along with the design parameters
[4]  Do suitable device selection by searching the database, matching the requirements and device specifications, identifying and resolving the dependencies, etc.
[5]  Generate logical (topology diagram) and physical design (BoM) along with corresponding reports and analysis charts.
[6]  else if Transformation Network Design
[7]  if DC only consolidation
[8]  Identify devices to be decommissioned (devices reaching EoL/EoS) and retained from the existing infrastructure data -continued Algorithm 1:

| | |
|---|---|
| [9] | if retained devices meet the requirements |
| [10] | New devices not needed (physical design not required). Generate list of decommissioned and retained devices and provide logical design (topology diagram) with corresponding reports and analysis charts |
| [11] | else |
| [12] | Analyze the LAN, SAN and WAN requirements along with the design parameters excluding the requirements satisfied by the retained devices |
| [13] | Do suitable devices selection and generate (logical diagram) and physical design (BoM) along with corresponding reports and analysis charts. |
| [14] | end if |
| [15] | else |
| [16] | fork = 1 to (number of target DCs) |
| [17] | Perform steps 8 to 14 for each target DC |
| [18] | end for |
| [19] | end if |
| [20] | end if |
| [21] | END |

Based on the above disclosed algorithm, the assessment module 216 analyzes the requirements and configurable design parameters to perform an As-Is-State analysis, a To-Be-State analysis, a WAN Bandwidth assessment, or a combination thereof. The As-Is-State analysis further comprises of EoL and EoS resolution (decommissioned and retained devices) if required by the design type, network port requirement analysis for servers, storage and other devices, and cost analysis. The To-Be-State Analysis further comprises of network devices and modules selection, cost analysis, Bill of Materials generation, Network topology diagram generation, DC Layout information generation and reports generation. The WAN bandwidth analysis further comprises per application type bandwidth determination and total threshold WAN bandwidth determination. The Virtual LAN (VLAN) structure is used in As-Is-State and is preserved in To-Be-State also. The transformation design caters to the network requirement of the physical servers or storage or any other devices used in As-Is-State, and is independent of the VLAN structure. Hence, there is no change in VLAN structure.

The assessment module 216 also identifies mapping between one or more servers or storage devices or any other devices and the network devices and modules of one or more layers and/or zones.

The analysis performed by assessment module 216 comprises of determining network port details from the requirements received from the user. The assessment module 216 is configured to create an optimized design criterion based upon the requirement, the configurable design parameters, and the network port details associated with the entities. The assessment module 216 then selects one or more devices and software modules based on the optimized design criterion. Based upon selection of devices and software modules, the analysis results are generated.

The one or more analysis results include Internet Protocol (IP) schema of entities, WAN bandwidth assessment, EoL/EoS resolution, DC layout information, report generation. The WAN bandwidth assessment determines the minimum bandwidth required to support all the applications in the enterprise DC. The EoL/EoS resolution provides identification End-of-Sale and End-of-Life network devices in case of a transformation design type (or simply transformation design) and suggesting suitable replacements. The DC layout information provides information about the rack space size and power consumption of each network device. The assessment module 216 provides analysis results in the form of reports to provide BoM in the form of a spreadsheet file and summarized report in a form of a Pdf document.

Figure 6:
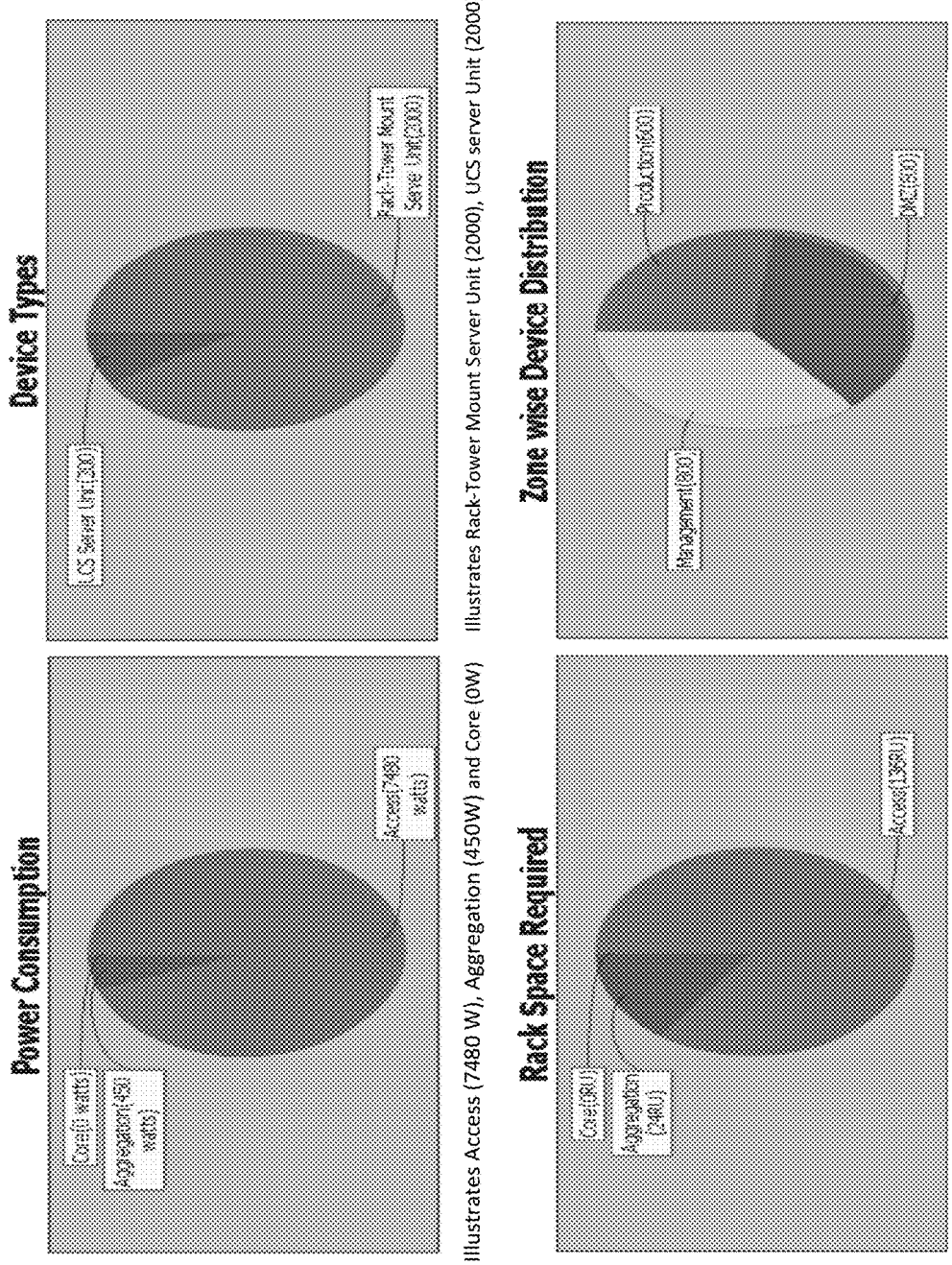
FIG. 6 illustrates analysis charts generated by using the analysis results, in accordance with alternate embodiment of the present subject matter.

Referring to FIG. 6, the analysis results are displayed in form of graphical charts. The analysis result comprises information pertaining to power consumption by the computer network, rack space requirements, devices present in the computer network.

The assessment module 216 uses the analysis results to determine at least one of the layer-wise and/or zone-wise requirement and distribution of network devices and modules associated with the one or more entities. The layer-wise and/or zone-wise requirement comprises of layer-wise and/or zone-wise server requirement, layer-wise and/or zone-wise switches requirements; layer-wise and/or zone-wise cost requirements, layer-wise and/or zone-wise bandwidth requirements for each of LAN, SAN and WAN forming the network.

The generation module 218 will generate the one or more network design for the one or more entities based on the selected layer-wise and/or zone-wise requirement of the one or more network device and modules along with the analysis results. The one or more network designs (or simply designs) comprise a Logical design and a Physical Design.

The generation module 218 will generate the logical design (Network Topology Diagram) that shows the topology of the LAN, SAN and WAN of the enterprise data center. In the Physical Design (Bill-of-Materials) the generation module will generate a list of Network Devices (LAN, SAN and WAN) for the enterprise DC with model numbers, pricing information and brief description.

The system 102 comprises the agility module 220 configured to update the generated BoM and topology diagram based on changes made by a designer on fly, such as changing/tweaking any input parameter or adding other products, accessories, vendor defined product bundles, etc., to the BoM.

By way of a non-limiting exemplary embodiment, system 102 generating a new design of one or more entities in an enterprise network is explained. Requirements are received for DC holding 3000 UCS servers, 9000 Rack mount servers, 200 Disk storage devices, and 200 Tape storage devices to get a 2-tier network design using the system 102. The results provided a design with Network Topology diagram and BoM with quantity, rack space, power consumption and pricing information for the network devices. The list of network devices for the new DC consisted of the CISCO® Nexus 5000 and 2000 series switches for Aggregation and Access layers, CISCO® ASA 5500 series security appliance, CISCO® MDS 9500 series storage switch, Catalyst 2960S series switch and compatible transceivers (as per the design parameters selected).

Figure 3:
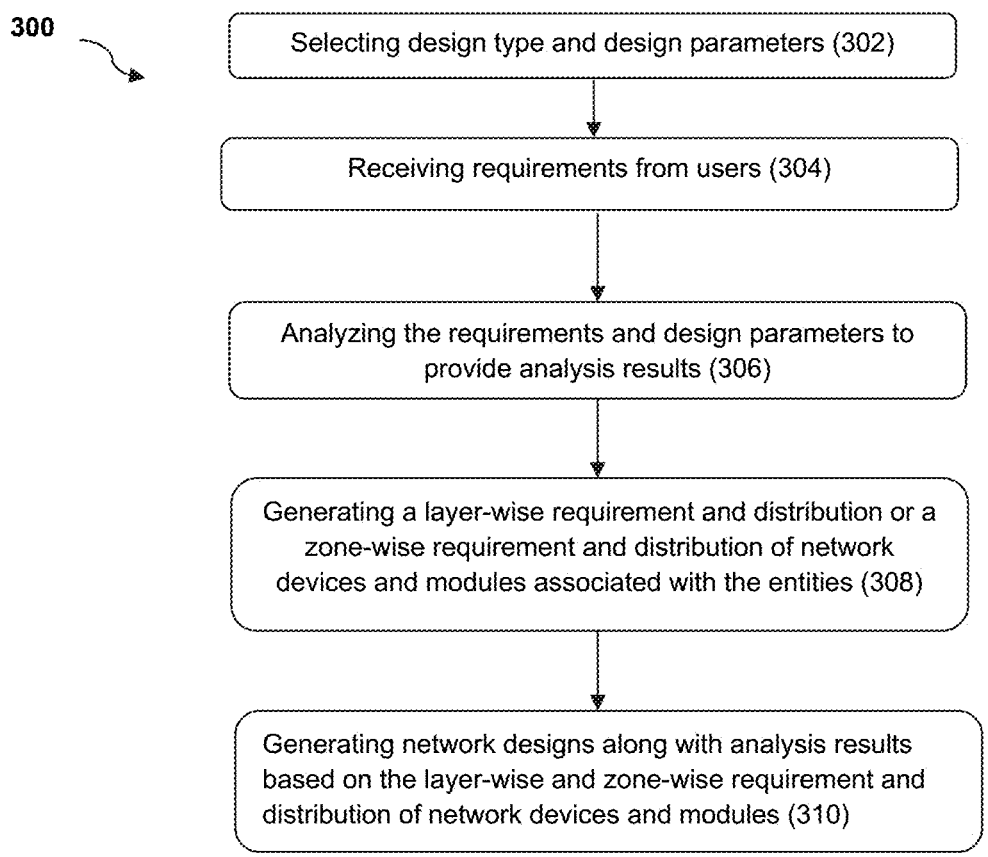
FIG. 3 illustrates a method to design a network for one or more entities forming an enterprise network, in accordance with an embodiment of the present subject matter.

Referring to FIG. 3, the order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, a design type is selected from a list of design types associated with configurable design parameters.

At block 304, requirements associated with designing of the one or more entities are collected from users.

At block 306, the requirements and configurable design parameters are analyzed to provide analysis results.

At block 308, at least one of a layer-wise requirement and distribution or a zone-wise requirement and distribution of one or more network device and modules associated with the one or more entities are determined based on the analysis results and with respect to the design type selected by the user.

At block 310, one or more design types are generated along with the analysis results for the network of the one or more entities based on the layer-wise requirement.

The written description describes the subject matter herein to enable any person skilled in the art to make and use the embodiments of the invention. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A system for designing a network of one or more entities in an enterprise, the system comprising:
   a processor; and
   a memory coupled to the processor, wherein the processor is capable of executing a plurality of modules stored in the memory, and wherein the plurality of modules comprise:
   a selection module for a user to select a design type from a list of design types, wherein the design type is associated with configurable design parameters to initiate a transformation from an AS-IS state to TO-BE-state, and wherein data is cleaned and normalized;
   a collecting module that receives requirements for one or more entities associated with a design from the user;
   an assessment module that:
   analyzes the requirements and the configurable design parameters to provide analysis results;
   optimizes one or more network devices to create at least one of an access layer, an aggregation layer and a core layer to form a multi-tier network;
   provides identification related to at least one of End-of-sale and End-of-life network devices to further provide information about at least one of rack space size and power consumption of each network device; and
   determine at least one of a layer-wise requirement and distribution, a zone-wise requirement and distribution of the one or more network device and modules associated with the one or more entities based on the analysis results, and with respect to the design type selected by the user; and
   analyze the requirements and configurable design parameters to perform an As-Is-State analysis, a To-Be-State analysis, a WAN Bandwidth assessment;
   identify a mapping between one or more servers or storage devices and the network devices and modules of one or more layers and/or zones;
   calculate network port details from the requirements;
   create an optimized design criterion based upon the requirement, the configurable design parameters, and the network port details;
   select one or more network devices and modules based on the design criterion, wherein the one or more network devices and modules are present in the computer network, and wherein the network devices and modules are selected from a database; and
   a generation module that generates one or more designs of the network of the one or more entities along with analysis results based on the layer-wise requirement and distribution or the zone-wise requirement and distribution of the one or more network device and modules associated with the one or more entities.

2. The system of claim 1, wherein the requirements comprise information about server and storage device information about at least one of availability, scalability, resiliency, affordability and reliability of the one or more entities, wherein the requirements are received in form of a spreadsheet, wherein the spreadsheet comprises information about product vendor devices used in the computer network, wherein the devices comprise at least one of Switches, Routers, Firewalls, Load Balancers, Intrusion Prevention System (IPS), Virtual Private Network (VPN) concentrators, Transceivers and Accessories.

3. The system of claim 1, wherein the configurable design parameters comprise at least one of LAN design parameters, WAN design parameters, SAN design parameters, Security design parameters, Performance design parameters and Service design parameters.

4. The system of claim 1, wherein the As-Is-State analysis further comprises of End of Life (EoL) and End of Sale (EoS) resolution (decommissioned and retained devices) network port requirement analysis for servers, storage and other devices, and cost analysis, wherein the To-Be-State Analysis further comprises network devices and modules selection, cost analysis, Bill of Materials generation, Network topology diagram generation, DC Layout information generation and reports generation, wherein the WAN bandwidth analysis further comprises per application type bandwidth determination and total threshold WAN bandwidth determination.

5. The system of claim 1, wherein the design type is at least one of a transformation design, a new design, and an optimization design.

6. The system of claim 1, wherein the at least one of the layer-wise requirement and distribution and the zone-wise requirement and distribution of network devices and modules comprises a layer-wise or zone-wise server requirement, layer-wise and zone-wise switches requirements; layer-wise and zone-wise cost requirements, layer-wise and zone-wise bandwidth requirements for each of LAN and SAN forming the network.

7. The system of claim 1, wherein the one or more designs comprise a logical design and a physical design, and wherein the physical design is a Bill of materials, and wherein the logical design is a design of a network topology diagram, wherein the Bill of materials is a list of network components to be used for one or more entities.

8. The system of claim 1, wherein the analysis results are displayed as tables, graphical charts and diagrams, and wherein the analysis results comprise information pertaining to network devices and modules required, As-Is-State and To-Be-State topology diagrams, power consumption by the computer network, rack space requirements, and decommissioned and retained devices present in the computer network.

9. The system of claim 1, wherein the analysis results comprise information associated with determination of minimum WAN bandwidth, identification of End-of-sale (EoS) and End-of-life (EoL) network components related to transformation, and zone wise network devices selection and distribution.

10. The system of claim 1, wherein the layers comprise at least one of Access layer, Aggregation/Distribution layer, a Core layer forming a multi-tier network or (High Performance Computing) HPC or a financial collocation or trading network, wherein the network optionally includes a traditional non-Software Defined Network (SDN), a Software Defined Network (SDN) or a combination thereof.

11. The system of claim 1 further comprising an agility module configured to update a generated BoM and topology diagram based on changes made by a designer to the BoM.

12. A computer implemented method for designing a network of one or more entities in an enterprise, the method comprising:
    selecting a design type from a list of design types, wherein the design type is associated with configurable design parameters for initiating a transformation from an AS-IS state to TO-BE-state, and wherein data is cleaned and normalized;
    collecting requirements associated with the one or more entities based on the design type selected;
    analyzing the requirements and configurable design parameters to provide analysis results and to perform at least one of an As-Is-State analysis, a To-Be-State analysis, a WAN Bandwidth assessment;
    identifying mapping between one or more servers and storage devices, other devices and the network devices and modules of one or more layers and zones, wherein the zones comprise at least one of a development, a staging, a testing, a production;
    analyzing Virtual LAN (VLAN) Structure, wherein the VLAN structure remains unchanged in a Transformation design type;
    calculating network port details from the requirements;
    creating an optimized design criterion based upon the requirement, the configurable design parameters, and the network port details;
    selecting one or more network devices and modules based on the design criterion, wherein the one or more network devices and modules are present in the computer network, and wherein the network devices and modules are selected from a database;
    optimizing one or more network devices to create at least one of an access layer, an aggregation layer and a core layer to form a multi-tier network;
    providing identification related to at least one of End-of-sale and End-of-life network devices to further provide information about at least one of rack space size and power consumption of each network device;
    determining at least one of a layer-wise requirement and distribution or a zone-wise requirement and distribution of the one or more network devices and modules associated with the one or more entities based on the analysis results, and with respect to the design type selected by the user; and
    generating one or more designs along with the analysis results for the network of the one or more entities based on the at least one of the layer-wise requirement and distribution or the zone-wise requirement and distribution of network devices and modules associated with the one or more entities, wherein the selecting, the collecting, the analyzing, the determining and the
    generating are performed by a processor using computer-readable instructions stored in a memory.

13. The method of claim 12, wherein the As-Is-State analysis further comprises End of Life (EoL) and End of Sale (EoS) resolution, network port requirement analysis for servers, storage, the To-Be-State Analysis further comprises network devices and modules selection, cost analysis, Bill of Materials generation, Network topology diagram generation, and/or DC Layout information generation and reports generation, and wherein the WAN bandwidth analysis further comprises per application type bandwidth determination and total threshold WAN bandwidth determination.

* * * * *